(12) United States Patent
Sato

(10) Patent No.: US 9,644,371 B2
(45) Date of Patent: May 9, 2017

(54) BOARD PANEL

(76) Inventor: Kenichi Sato, Fukuoka (JP)

( * ) Notice: Subject to any disclaimer, the term of this patent is extended or adjusted under 35 U.S.C. 154(b) by 0 days.

(21) Appl. No.: 13/984,162

(22) PCT Filed: Feb. 13, 2012

(86) PCT No.: PCT/JP2012/053208
§ 371 (c)(1),
(2), (4) Date: Aug. 7, 2013

(87) PCT Pub. No.: WO2012/111582
PCT Pub. Date: Aug. 23, 2012

(65) Prior Publication Data
US 2013/0330508 A1    Dec. 12, 2013

(30) Foreign Application Priority Data

Feb. 18, 2011   (JP) .................................. 2011-032993

(51) Int. Cl.
*B32B 3/24* (2006.01)
*E04C 2/34* (2006.01)
*E04C 2/12* (2006.01)
*E04C 2/32* (2006.01)

(52) U.S. Cl.
CPC .................. *E04C 2/34* (2013.01); *E04C 2/12* (2013.01); *E04C 2/328* (2013.01); *Y10T 428/24314* (2015.01)

(58) Field of Classification Search
CPC .......................... Y10T 428/24314; E04C 2/34

USPC ........................................................ 428/136
See application file for complete search history.

(56) References Cited

U.S. PATENT DOCUMENTS 2,397,415 A * 3/1946 Ghez et al. ................... 428/136

FOREIGN PATENT DOCUMENTS

| JP | 54-127878 U | 9/1979 |
| JP | 63-84312 U | 6/1988 |
| JP | 3086830 U | 7/2002 |
| JP | 7-119239 A | 1/2007 |
| JP | 2007-2454 A | 1/2007 |
| JP | 2009-41302 A | 2/2009 |

* cited by examiner

*Primary Examiner* — William P Watkins, III
(74) *Attorney, Agent, or Firm* — Fox Rothschild LLP

(57) ABSTRACT

The present invention is transportable economically in a flat state, and easy to attach and detach, and can provide a curved surface simply while maintaining decoration and strength without craftsmanship. Slits are provided on a rectangular board panel comprising two or more layers of a hard material and a soft material. Two or more layers comprising a hard material and a soft material are laminated on a rectangular board panel, and slits having a length of ½ to ¾ of the vertical side are provided thereto. The use of slits makes formation of curved surfaces easy. Since there is no need to reinforce the outside to maintain the strength thereof, the board panel can be removed easily. Even if in external pressure is applied to the board panel, the flexibility of the hard material divided by the slits and the elastic characteristic of the soft material cause the pressure to be dispersed and absorbed.

8 Claims, 4 Drawing Sheets

(a)

(b)

(c)

BOARD PANEL

CROSS-REFERENCE TO RELATED APPLICATIONS

This application is the U.S. National Phase of International Patent Application Serial No. PCT/JP12/53208 filed Feb. 13, 2012, which claims priority to Japanese Patent Application Number 2011-032993 filed Feb. 18, 2011, the disclosures of which are hereby incorporated by reference in their entireties.

TECHNICAL FIELD

The present invention relates to a board panel for use in furniture components or partition walls.

BACKGROUND TECHNOLOGY

A person sometimes wants to have a curved shape on furniture or partition walls. For example, in furniture, a person wants to have a human friendly shape in which the chair seat is fitted to the both wants to change the seat shape freely to accommodate the sitting posture. In partition walls, a person wants to have a curved shape, not a flat shape, to reduce acoustic reflections, or for a design friendly to young children and old people (to protect them from injuries from the unexpected wall impact).

Wall hoards made of plywood or plaster hoards cannot have curved surfaces. For this reason, board panels have been bent to provide curved surfaces. Nevertheless, to create a desired shape by bending board panel craftsmanship was required.

In order to solve the problem, Patent Document 1 discloses a board panel on which a curved surface can be formed easily by installing in that go through the board panel in the side direction on the front and back side surfaces of the board panel both made from a foamed resin, and placing the tips of the front side-slit and the back side-slit more toward the inner part than the center of the board thickness.

However, the board panel disclosed in Patent Document 1 had the following problems: (1) The board panel material is limited only to a foamed resin which provides insufficient strength by itself alone as a construction structure when pressed from the outside; therefore, bent veneers and so on also need to be laminated. (2) Doing so requires much expense in time and effort and craftsmanship. Since the lamination is performed by fixing the outside with bent veneers, the board panel cannot be removed, which is uneconomical, (3) Since slits go through the board panel in the side direction of the board panel, the surface part is a divided rectangle; therefore, even if the front face is made of a hard material such as wood and so on, enough strength cannot be obtained. Patent Document 1: Unexamined Patent Application Publication No 2009-041302.

DISCLOSURE OF THE INVENTION

Problems the Invention Intends to Solve

The present invention provides a board panel which is transportable economically in a flat state, and easy to attach and detach, and can provide a curved surface simply while maintaining decoration and strength without craftsmanship.

Means to Solve the Problems

The present invention is a board panel with a rectangular top characterized in that it has two or more stacked layers comprising a hard material and a soft material; wherein the front face layer is a layer of a hard material in which slits are provided in parallel with the vertical side of said rectangle; said slits have a length of ½ to ¾ of said vertical side, and one end thereof touches the horizontal side of said rectangle; and said slits include one type in which one end thereof touches the upper horizontal side of said rectangle (upper slit) and the other type in which one end thereof touches the lower horizontal side of said rectangle (lower slits).

Here, the "hard material" means the material for which it is difficult to obtain a desired curvature by pressure deformation. Many hard materials such as wood, metal, plastic, and so on are included in the hard materials.

The "soft material" means the material for which it is easy to obtain a desired curvature by pressure deformation. The soft material includes rubber, many soil synthetic resins and so on. Further, the soft material has elasticity to absorb the pressure (the pressure generated by the weight of a person, for instance, for use in a chair-seat) applied to the surface of the board panel.

The "slit" means as band (a line having a width) of groove toward the inside the board panel when viewed from the outside of the board panel.

Slits go through the hard material. Further, since slits have a length of ½ to ¾ of the vertical side and are in the form of upper slits and lower slits, the rectangle has slits on any lines that are in parallel with the horizontal sides of the rectangle; therefore, a curvature can be formed easily in the horizontal direction of the rectangle in the similar manner as Patent Document 1.

The slits have a length of ½ to ¾ of the vertical side. Any line having a length of ½ or more that is in parallel with the horizontal side intercepts with slits. A curvature can be formed in the direction of the horizontal side of the board panel. The length is ¾ or less and does not go through the vertical side. As a result, the board panel of the present invention does not face the drawback of sacrificing strength of the board panel disclosed in Patent Document 1. Depending on the application, partial strength enhancement can be made by laminating materials such as veneer, etc. an the stretched surface of plywood, etc. For instance, when used in a chair, considering that the maximum pressure is applied to the seat part, the strength enhancement specific to the seat section may be considered. This may provide different elasticity, sensation, and so on for the sitting person. There is no need for reinforcing the externality, which makes attachment and detachment thereof easy.

Since the board panel is not separated by slits, they may be formed to pass through the board panel. Naturally, slits may have the depth up to the middle point of the board panel rather than passing therethrough.

Anything may be used for the hard material of the front face layer as long as slits pass through the front face of the layer. Any materials including wood, metal, and so on may be selected optionally to render a decorative board panel.

The board panel of the present invention is characterized in that said upper slits and said lower slits are arranged alternately.

By alternating the upper slits and lower slits, gaps between slits are made smaller also near the upper side or lower side, thereby making the formation of a curvature easy.

Furthermore, the smaller gaps between slits separate the hard material on the front face to a slim shape. The hard material on the front face deforms in such a way that each separate slim shape deforms to disperse and absorb the pressure in response to the pressure applied to the front face of the board panel. Even if the pressure applied to one slim part is transmitted to adjacent slim parts as stress, it will be a small stress. This makes the probability of damaging the hard material on the front face due to the pressure applied thereto become small.

The board panel of the present invention is characterized in that said slits are spaced 5 mm or more on the straight line connecting the middle points of said vertical sides while said slits are spaced 40 mm or less on said horizontal sides.

In order to strengthen each of the slim parts, it is preferable that slits be spaced 5 mm or more on the straight line connecting the middle points of the vertical side. In order to reduce the probability of damaging the slim shape due to the internal stress, it is preferable that said slits be spaced 40 mm or less on said horizontal side.

The board panel of the present invention is characterized in that said front face layer is a wood layer and said vertical side is in the direction of wood grain of the wood.

The use of wood for the front face layer provides the wood texture-based decorativeness.

When a piece of wood is given a slim shape, the wood grain kept in the elongated direction reduces the probability of damaging it due to deformation. Since slits are formed in parallel with the vertical sides, when the vertical sides become the sides in the direction of wood grain, the parts having a slim shape are elongated in the direction of wood grain. However, there is no need for the "side in the direction of wood grain" to be strictly in parallel with wood grain. In the vertical direction or the horizontal direction of the rectangular board, the side closer to wood grain may be selected.

The present invention is a board panel with a rectangular top characterized in that it has three or more stacked layers comprising a hard material and a soft material; wherein said board panel comprises the first hard material layer on the front face, a soft material layer (middle soft material layer) which touches said first hard material layer; and the second hard material layer which is more toward the rear face side than said middle soft material layer; layers other than said first hard material layer and the second hard material layer are soft material layers; slits (front face-side slits) are formed in parallel with the vertical side of said rectangle on said first hard material layer of said board panel, said front face-side slits have a length of ½ to ¾ of the length of said vertical side, and one end thereof touches the horizontal side of said rectangle while the depth thereof reaches said middle soft material layer but does not reach said first hard material layer; said two or more front face-side slits include the type in which one end thereof touches the upper horizontal side of said rectangle (upper front face slits) and the other type in which one end thereof touches the lower horizontal side of said rectangle (lower front face slits); two or more slits (rear face-side slits) that are in parallel with the vertical side of said rectangle are provided on the rear face-side of said board panel; said rear face-side slits have a length of ½ to ¾ of that of said vertical side, and one end thereof touches the horizontal side of said rectangle while the depth thereof goes through said second hard material layer but does not reach said first hard material layer; said two or more rear face-side slits include the type in which one end thereof touches the upper horizontal side of said rectangle (upper rear face slits) and the other type in which one end thereof touches the lower horizontal side of said rectangle (lower rear face slits); and said front face-side slits and said rear face-side slits are arranged alternately.

The slits formed on each of the front and rear faces and arranged alternately prevent themselves from overlapping in the thickness direction of the board panel, thereby enhancing the overall strength thereof.

Furthermore, the overall strength of the board panel can also be enhanced by introducing a thin material such as a fabric and so on containing a lattice of fibers for the middle soft material layer.

Depending on the application, partial strength enhancement can be made by laminating materials such as veneer, etc. on the stretched surface of plywood, etc. For instance, when used in a chair, considering that the maximum pressure is applied to the seat part, the strength enhancement specific to the seat section may be considered. This may provide different elasticity, sensation, and so on for the sitting person.

The shape of slits on the front face side and the rear face side viewed from the outside the board panel is the same as that of the above.

Since the front face-side slits go through the layer of the first hard material, and the rear face-side slits go through the layer of the second material, both of the hard material layers can form a curvature, thereby enabling the entire board panel to be curved.

The board panel of the present invention is characterized in that said upper front face slits and said lower front face slits are arranged alternately, and said upper rear face slits and said lower rear face slits are arranged alternately.

The board panel of the present invention is characterized in that said front face-side slits and said rear face side-slits are spaced 5 mm or more on the straight line connecting the middle points of said vertical sides, and said front face side-slits and said rear face side-slits are spaced 40 mm or less on said horizontal side.

The board panel of the present invention is characterized in that said first hard material layer and said second hard material layer are wood layers, and said vertical side thereof is in the direction of wood grain.

The board panel of the present invention is characterized in that said second hard material layer is the rear face layer.

Both layers on the front face and the rear face become hard material layers. In the application in which both the front and rear faces are exposed, the hard material layers alone are exposed, and, for instance, decoration stemming from the hard material layer of wood can be attained.

The board panel of the present invention is characterized in that it comprises a face (middle plane) between the front face and the rear face of said board panel wherein it does not contain any of said front face side-slits and said rear face side-slits between the tip of said front face side-slits and the tip of said rear face side-slits.

The overall strength of the board panel can also be enhanced by the use of the slit-free middle plane. There is no hindrance for the board panel to form a curved surface even if slits are not formed, as long as the middle plane is a soft material.

Effects of the Invention

Since the present invention is a board panel which can provide a curved surface easily and maintains decorativeness and strength, it can be utilized for wall surfaces, furniture, and so on.

Furthermore, as a raw material to make furniture having curved surfaces of various shapes such as chairs, one type of standardized board panel can be used to form curved surfaces of various shapes, thereby saving time required for selecting board panel.

BEST MODE OF PRACTICING THE INVENTION

The present invention is described herein with reference to working examples.

Working Example 1

Figure 1:
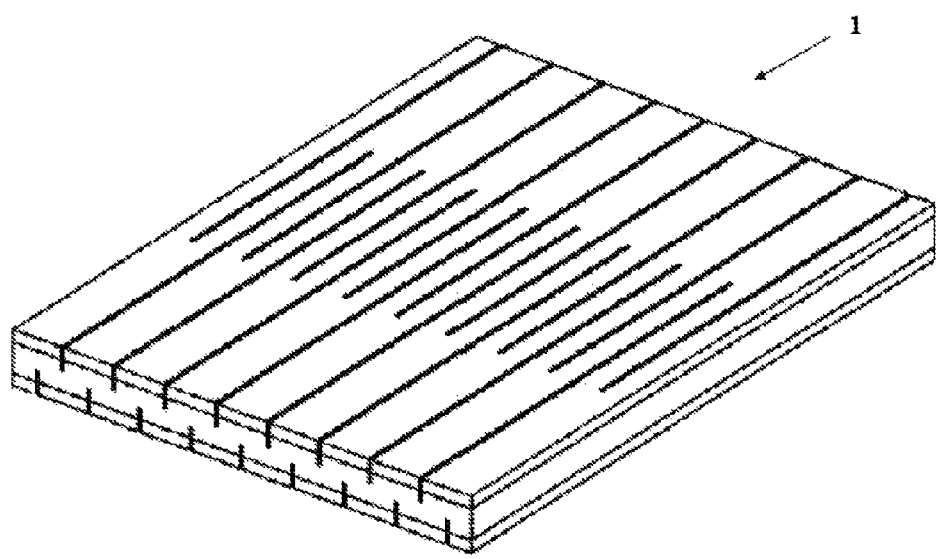
FIG. 1 is a perspective view illustrating an example of the board panel of the present invention.

FIG. 1 is a perspective view illustrating an example of the board panel of the present invention.

Figure 2:
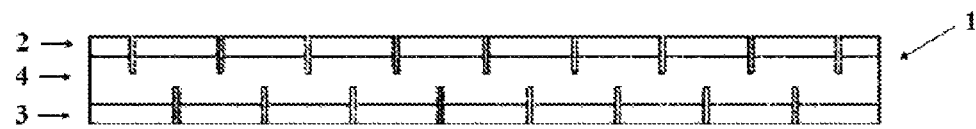
FIG. 2 is a diagram illustrating the side view of the board panel.

As illustrated in FIG. 2, in board panel 1, front face hard material layer 2, rear face hard layer 3 and soft material layer 4 are adhered and laminated. Front face hard material layer 2 and rear face hard layer 3 are made of plywood, and soil material layer 4 is made of a synthetic resin (PE 30).

Figure 4:
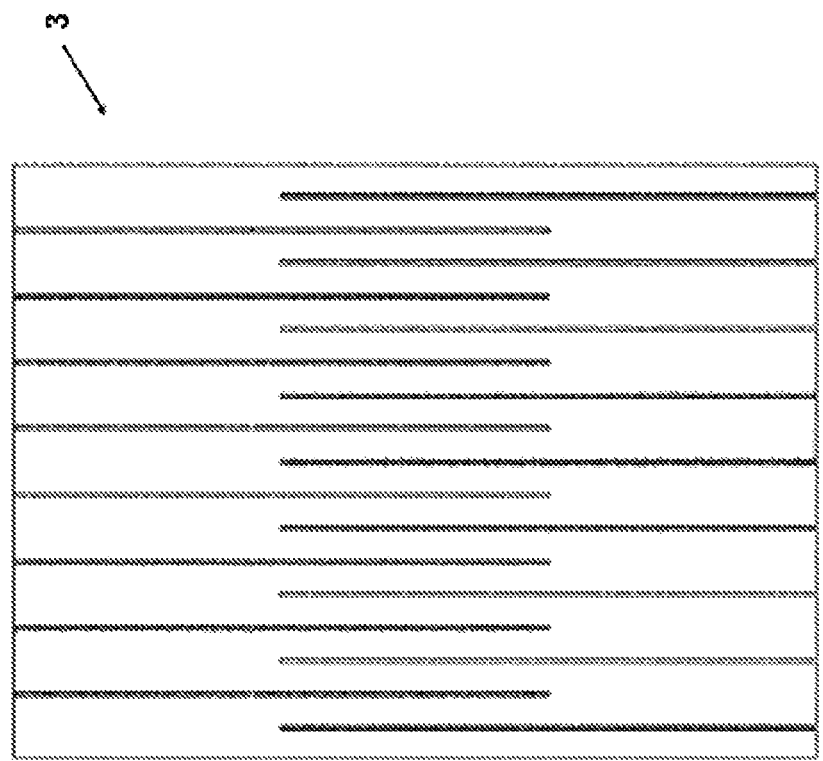
FIG. 4 is a bottom view of the board panel.
Figure 3:
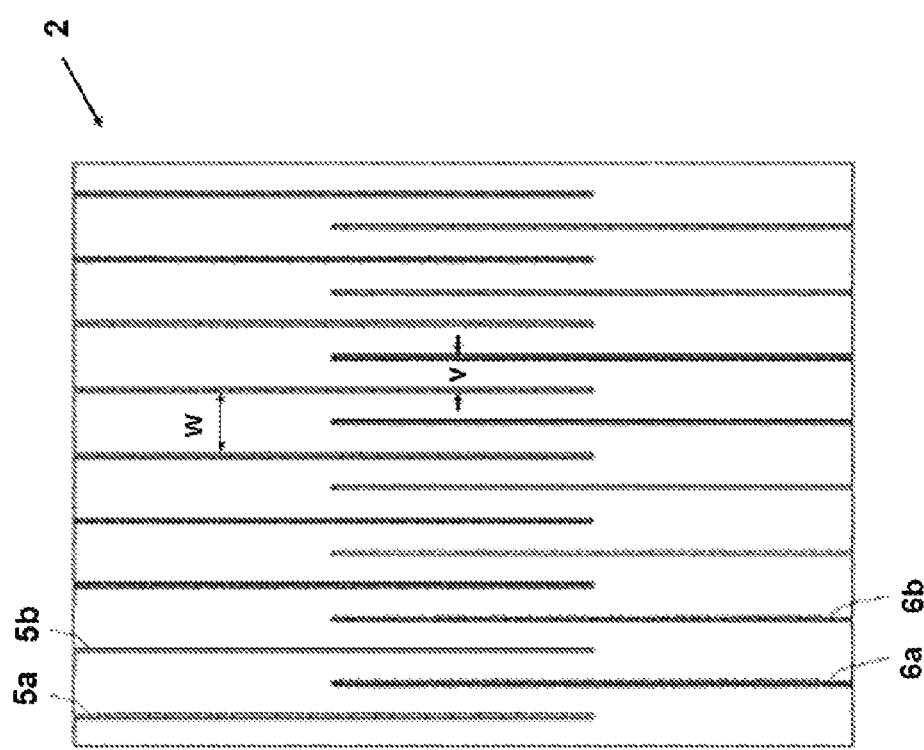
FIG. 3 is a plan view illustrating the board panel.

FIG. 3 is a plan view of the board panel. FIG. 4 is a bottom face view of the board panel.

The plywood that constitutes hard material layer 2 and rear face hard layer 3 has wood grain in the vertical direction of FIGS. 3 and 4. Furthermore, in the external rectangle of FIGS. 3 and 4, the side drawn vertically in the figure is the vertical side, and the side drawn horizontally is the horizontal side.

As illustrated in FIG. 3, equally-spaced upper slits 5a, 5b, ... and the equally spaced lower slits 6a, 6b, ... are provided alternately. The space of slits (referred to as "v") of the area in which both upper slits find lower slits exist is 6 mm, and the space of slits referred to as "w") of the area in which only upper slits exist and the area in which only upper slits exist is 12 mm.

As illustrated in FIG. 2, the front face is provided with slits at different locations from those of the rear face of board panel 1, and slits in FIG. 3 an provided at different locations from those in FIG. 4. Slits of the board panel do not overlap with each other in the thickness direction, and the overall strength of the board panel can be reinforced.

Figure 5:
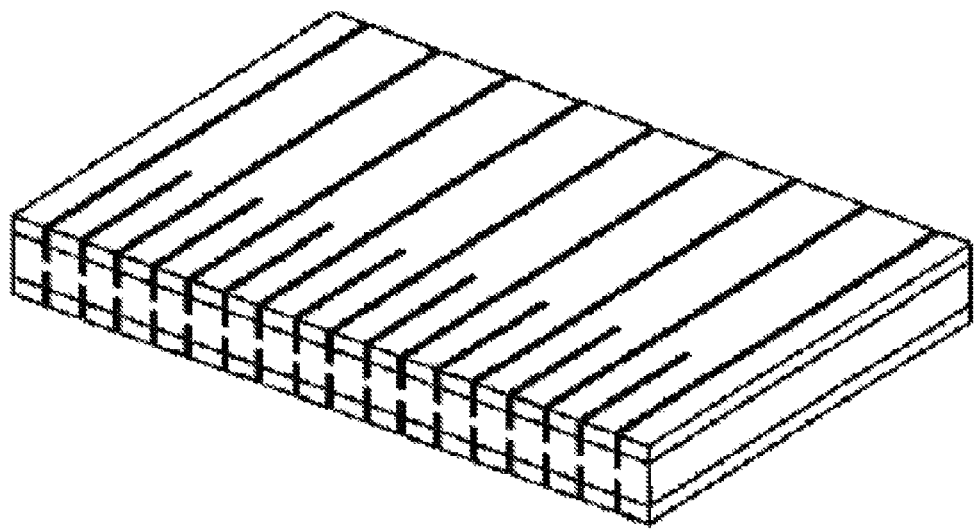
FIG. 5 is a diagram showing one half of the board panel.
Figure 6:
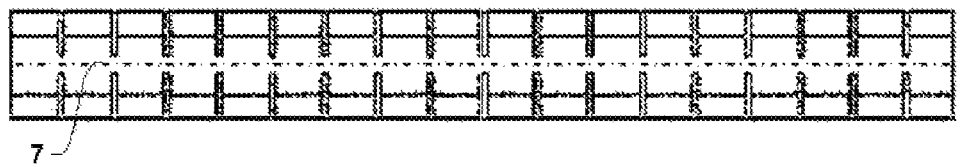
FIG. 6 is a cross-sectional view of the board panel.

FIG. 5 is a diagram illustrating a half of the board panel. It shows only one half of the inner part in FIG. 1. FIG. 6 is a cross-sectional view of the board panel. It shows the side view thereof in FIG. 5, and the cross-sectional view cut out in the center section in FIG. 1.

As illustrated in FIGS. 2 and 6, board panel 1 has slits having a depth which does not reach the center thereof, and has middle plane 7 which does not have slits between the front face and rear face. Middle plane 7 enhances the strength of the board panel. Moreover, the middle plane is shown with one-dotted line in FIG. 6; however, this does not mean that there is an article in reality. Middle plane 7 is a part of soft material layer 4.

Figure 7:
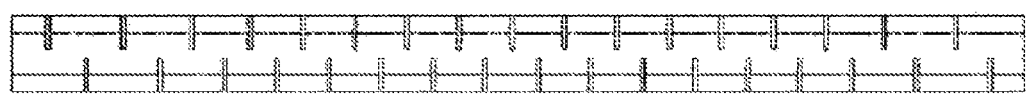
FIG. 7 is a diagram illustrating an example of the state in which a curved surface is formed.
Figure 7:
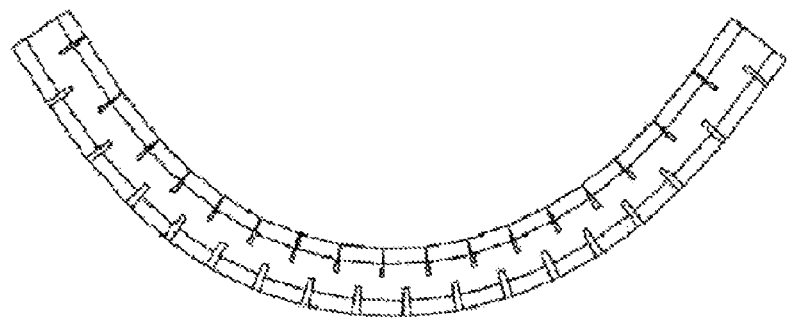
Figure 7:
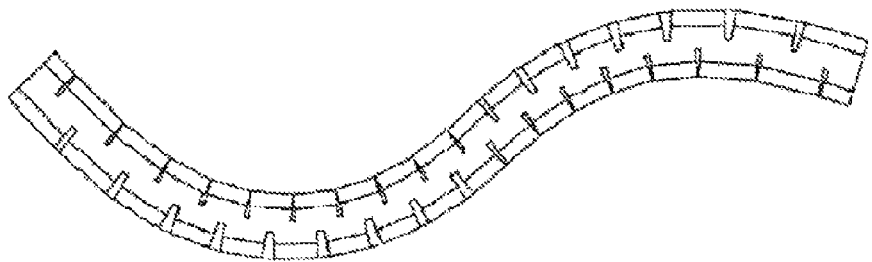

FIG. 7 is a diagram showing an example of a state in which a curved surface is formed. Figure (a) illustrates the flat state. By the use of slits, curved surfaces having the shapes as illustrated in Figures (b) and (c) can be formed. The middle plane section has no slit but deforms along the curved surface because it is a soft material.

INDUSTRIAL APPLICABILITY

Since the present invention is a board panel which can provide a curved surface simply while maintaining decoration and strength, and one type of standardized board panel can be used to form curved surfaces of various shapes, it can expect utilization by furniture manufacturers, construction companies, and so on.

The invention claimed is:

1. A board panel comprising:
    a rectangular top of three or more stacked layers, wherein at least two layers are a hard material and at least one layer is a soft elastic pressure absorbing material;
    a front face layer and a back face layer are layers of a hard material in which slits are provided in parallel with a vertical side of said rectangular top;
    said slits have a length of ½ to ¾ of said vertical side, and one end thereof touches the horizontal side of said rectangular top; and
    said slits include one type in which one end thereof touches an upper horizontal side of said rectangular top, forming upper slits, and another type in which one end thereof touches a lower horizontal side of said rectangular top, forming lower slits,
    said slits have a depth that do not penetrate through the board panel,
    wherein said slits provided on the front face layer alternate between slits touching the upper horizontal side and slits touching the lower horizontal side of said rectangular top,
    said slits provided on the back face layer alternate between slits touching the upper horizontal side and slits touching the lower horizontal side of said rectangular top, and
    wherein said front face layer and said back face layer alternate between slits touching the upper horizontal side and the lower horizontal side.

2. The board panel as set forth in claim 1 wherein said slits are spaced 5 mm or more on the straight line connecting the middle points of said vertical sides while said slits are spaced 40 mm or less on said horizontal sides.

3. The board panel as set forth in claim 1 wherein said front face layer is a wood layer and said vertical side is in the direction of wood grain of the wood.

4. A board panel comprising:
    a rectangular top with three or more stacked layers of a hard material and a soft elastic pressure absorbing material; wherein
    a first hard material layer is on a front face, a soft elastic pressure absorbing material layer touches said first hard material layer; and a second hard material layer is more toward a rear face side than said middle soft elastic pressure absorbing material layer;
    layers other than said first hard material layer and the second hard material layer are soft elastic pressure absorbing material layers;
    slits are formed in parallel with a vertical side of said rectangle on said front face of said first hard material layer of said board panel, forming front face-side slits;

said front face-side slits have a length of ½ to ¾ of a length of said vertical side, and one end thereof touches a horizontal side of said rectangle while a depth thereof reaches said middle soft elastic pressure absorbing material layer but does not reach said second hard material layer;

said two or more front face-side slits include a type in which one end thereof touches the upper horizontal side of said rectangular top, forming upper front face slits and another type in which one end thereof touches the lower horizontal side of said rectangular top, forming lower front face slits;

two or more slits that are in parallel with the vertical side of said rectangular top are provided on the rear face-side of said board panel, forming rear face-side slits;

said rear face-side slits have a length of ½ to ¾ of that of said vertical side, and one end thereof touches the horizontal side of said rectangular top while the depth thereof goes through said second hard material layer but does not reach said first hard material layer;

said two or more rear face-side slits include the type in which one end thereof touches the upper horizontal side of said rectangle, forming upper rear face slits, and the other type in which one end thereof touches the lower horizontal side of said rectangular top, forming lower rear face slits; and said upper slits and lower slits are arranged alternately on said front face-side, said upper slits and lower slits are arranged alternately on said rear face-side, said front face-side slits and said rear face-side slits are arranged alternately, and said front face-side slits and said rear face-side slits have a depth that do not penetrate through the board panel.

5. The board panel as set forth in claim 4 wherein said front face-side slits and said rear face side-slits are spaced 5 mm or more on the straight line connecting the middle points of said vertical sides, and said front face side-slits and said rear face side-slits are spaced 40 mm or less on said horizontal side.

6. The board panel as set forth in claim 4 wherein said first hard material layer and said second hard material layer are wood layers, and said vertical sides thereof is in the direction of wood grain.

7. The board panel as set forth in claim 4 wherein said second hard material layer is the rear face layer.

8. The board panel as set forth in claim 4 further comprising a face between the front face and the rear face of said board panel wherein it does not contain any of said front face side-slits and said rear face side-slits between the tip of said front face side-slits and the tip of said rear face side-slits.

* * * * *